United States Patent [19]
Thornton et al.

[11] Patent Number: 5,500,121
[45] Date of Patent: Mar. 19, 1996

[54] APPARATUS FOR MAGNETICALLY TREATING FLUIDS

[76] Inventors: Henry E. Thornton, 8937 NW. 27th St., Coral Springs, Fla. 33065; John S. Placanica, 61 Wayne Rd., Needham, Mass. 02192

[21] Appl. No.: 337,308

[22] Filed: Nov. 10, 1994

Related U.S. Application Data

[63] Continuation of Ser. No. 104,874, Aug. 10, 1993, abandoned, which is a continuation-in-part of Ser. No. 813,257, Jun. 9, 1992, abandoned.

[51] Int. Cl.$^6$ ............................................. C02F 1/48
[52] U.S. Cl. ............................... 210/222; 123/538
[58] Field of Search ........................... 210/222; 123/538

[56] References Cited

U.S. PATENT DOCUMENTS

| | | | |
|---|---|---|---|
| 4,755,288 | 7/1988 | Mitchell | 210/222 |
| 4,946,590 | 8/1990 | Hertzog | 210/222 |
| 5,024,759 | 6/1991 | McGrath et al. | 210/222 |
| 5,271,369 | 12/1993 | Melendrez | 123/538 |

FOREIGN PATENT DOCUMENTS

| | | | |
|---|---|---|---|
| 433035 | 6/1991 | European Pat. Off. | 210/222 |
| 189989 | 10/1984 | Japan | 210/222 |

*Primary Examiner*—Matthew O. Savage
*Attorney, Agent, or Firm*—Wolf, Greenfield & Sacks

[57] ABSTRACT

A magnetic fluid treatment device, including a non-ferromagnetic inner housing disposed within a non-ferromagnetic outer housing, at least two non-ferromagnetic caps to hold the inner housing in place, a ferromagnetic strip external to the inner housing, and structure for creating a magnetic field across the cross section of the inner housing.

1 Claim, 2 Drawing Sheets

APPARATUS FOR MAGNETICALLY TREATING FLUIDS

RELATED CASES

This is a continuation of U.S. patent application Ser. No. 08/104,874 filed Aug. 10, 1993, now abandoned, which was a continuation-in-part of U.S. patent application Ser. No. 07/813,257, filed Jun. 9, 1992, now abandoned.

FIELD OF INVENTION

This invention relates to a magnetic fluid treatment device that is particularly adapted to be placed over lines or pipes to inhibit deposition from the fluid in the lines onto the walls of the line.

BACKGROUND OF INVENTION

Many fluids traveling through pipes or conduits contain magnetic field sensitive particles that tend to cling to the inside walls of the pipe. Such fluids include beer, wine, liquor, soda, juices, hydrocarbon fuels, and even water. After a certain amount of time, these particles must be cleaned out from the inside of the pipe to prevent severe blockage. Known processes to clean these deposits are cumbersome, expensive, and time consuming. One such known process is to periodically shut off the fluid flow in the pipe and manually scrub the inside of the pipes. An apparatus that would prevent this buildup would necessarily eliminate the inefficiencies created by the deposits.

Magnetic treatment of fluids is known in the prior art. Typically, a magnetic field that reacts with magnetic fluid sensitive particles within a fluid is applied to the fluid passing through a pipe. This coupling leads to a multitude of beneficial effects. One such beneficial effect is the mutation of the molecular structure of various hydrocarbons, such as propane, natural gas, gasoline, diesel, liquid oxygen, and acetylene. A circular hydrocarbon molecule exposed to such a field tends to routate into a cage or cubic octahedral arrangement, effectively causing small amounts of oxygen to be injected into the molecule. When ignited, the burn factor thus dramatically increases and the carbon monoxide emissions decrease, efficiently reducing the harmful environmental effect of burning such fossil fuels and increasing fuel efficiency. A second beneficial effect is the disorientation of various charged particles that tend to scale or deposit on the inner walls of a pipe. The disoriented particles will pass through the pipe and not deposit on the inner walls. Researchers have discovered that various forms of bacteria are magnetically charged and thus subject to the physical effects of magnetic fields. Such untreated magnetostatic bacteria commonly create the substantial blockage in fluid transport pipes previously mentioned.

Several devices have been developed that magnetically treat fluids flowing through pipes. These devices generally emit a magnetic field within the pipe to accomplish the desired function.

Hertzog, U.S. Pat. No. 4,946,590, discloses a clamp-on magnetic water treatment device that minimizes hard precipitate scale and lime deposit in a water fluid supply. Two significant embodiments are disclosed, both having a plurality of opposing magnets on each side of a pipe to be treated. The plurality of opposing magnets are stacked and/or serially aligned along the pipe with opposite polarities. Both embodiments further have a ferromagnetic outer housing that has a flat bottom and wings that extend diagonally outward from the pipe at an obtuse angle from the bottom. Such an apparatus is subject to various performance deficiencies. The opposing magnets create an unconcentrated but uniform magnetic field within the pipe. Much of the magnetic field, however, is wasted outside of the pipe, thereby forcing the device designer to use more magnets than are necessary to efficiently utilize the apparatus, thus driving up the ultimate manufacturing cost. Furthermore, the stacked magnets of Hertzog are specifically disclosed to be magnetized iron or ceramic magnets, each of which has a much shorter length of flux and Gauss field, as well as shorter life, than other magnets known in the art today. The ferromagnetic outer housing further serves only to limit the escape of magnetic flux lines from the apparatus. It does not redirect the magnetic field within the pipe, and thus has no significant effect upon the magnetic field within the pipe. Finally, Hertzog is disclosed to be useful only in treating water, the implication being that it is not designed to treat other fluids containing magnetic field sensitive particles.

Kulish, U.S. Pat. No. 4,605,498, also teaches a method and apparatus for magnetically treating liquids utilizing a plurality of magnets arranged about the periphery of a pipe. Similar to the Hertzog disclosure, such an apparatus also provides an unconcentrated, uniform magnetic field within the pipe and thus suffers the same design and performance problems as those of the Hertzog disclosure.

Accordingly, there is a great need for a device that can more efficiently inhibit the deposition of material from a fluid onto the walls of a pipe, as well as alter the molecular structure of charged particles within a hydrocarbon fuel passing though a pipe.

SUMMARY OF INVENTION

It is therefore an object of this invention to prevent blockage in supply lines due to the globular buildup of magnetic field sensitive particles within a fluid passing through the supply lines.

It is also an object of this invention to disorient magnetostatic bacteria within fluids traveling through pipes or supply lines.

It is a further object of this invention to eliminate the need for constant cleaning of supply lines due to globular buildup therein.

It is another object of this invention to provide an apparatus that better concentrates a magnetic field around the circumference of a tube or pipe.

It is also an object of this invention to provide a higher power and lower cost magnetic fluid treatment device that has a longer life span.

It is a further object of this invention to provide a magnetic fluid treatment device that is more easily accessible and manipulatable about a pipe.

It is also an object of this device to promote higher fuel efficiency and cleaner fuel burning.

It is a further object of this invention to provide a magnetic fluid treatment device that is adapted for use on beer, wine, liquor, soda, juices, bacteria and hydrocarbon fuels and water.

This invention results from the realization that a controlled magnetic field about the cross section of a pipe can beneficially manipulate charged particles within a fluid passing through the pipe. A controlled magnetic field can be created with a single row of magnets and a ferromagnetic member positioned directly across the pipe.

This invention consists essentially of a magnetic fluid treatment device having a non-ferromagnetic inner housing that is disposed within a non-ferromagnetic outer housing. The inner housing is held in place by at least two caps that are disposed between the inner and outer housings. A means for creating a magnetic field is disposed external to the inner housing, as is a ferromagnetic strip, that redirects the magnetic field. The means for creating a magnetic field and the ferromagnetic strip are preferably on opposite sides of the inner housing.

There are several means for creating the magnetic field about the cross section of the inner housing. One such means is by using three neodymium bar magnets that are serially aligned with opposite polarity to create a variable field of positive and negative forces. Other means include using a wire, induction coil, or other known means for producing a magnetic field across the cross section of the inner housing. Inner and outer housings have hemi-cylindrical top and bottom parts, respectively. The top and bottom parts of each housing are pivotably connected by a means for pivoting, that includes a hinge, to form the cylindrical inner and outer housings, respectively.

Another embodiment includes a non-ferromagnetic housing, an external means for creating a magnetic field within the housing, and a means for redirecting the path of the magnetic field. The means for redirecting the magnetic field includes a ferromagnetic strip that is external to the housing and opposite the means for creating a magnetic field. The means for creating a magnetic field can include a plurality of neodymium magnets that are serially aligned with opposite polarity to create a variable field with positive and negative forces. The means for creating the magnetic field can also include an induction coil, a wire, or any other known means for creating a magnetic field within the housing. The non-ferromagnetic housing has a top and bottom part and is connected by a means for pivoting, that includes a hinge, to form a cylindrical housing.

DISCLOSURE OF PREFERRED EMBODIMENT

Other objects, features and advantages will occur to those skilled in the art from the following description of a preferred embodiment and the accompanying drawings, in which.

Figure 1:
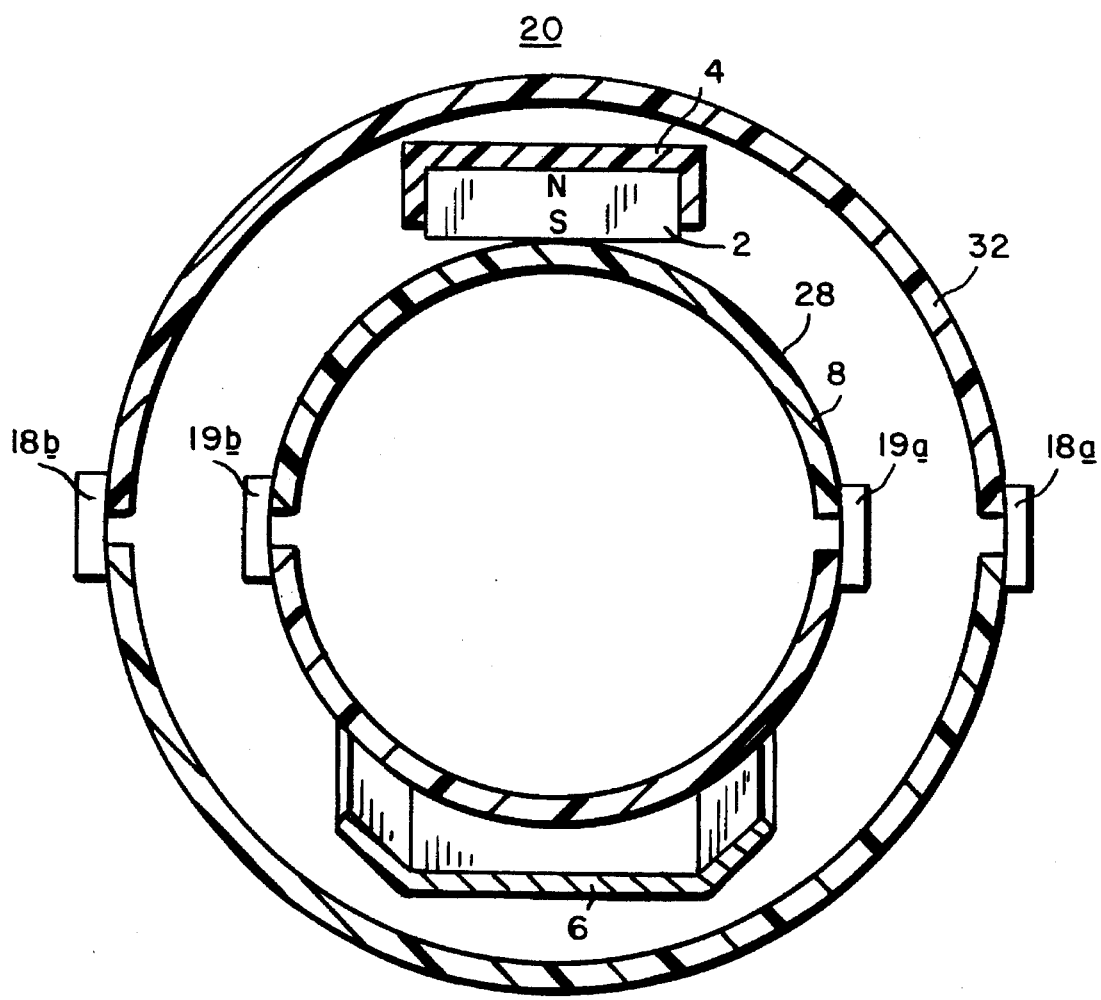
FIG. 1 is a cross-sectional view of a magnetic fluid treatment device according to this invention.
Figure 2:
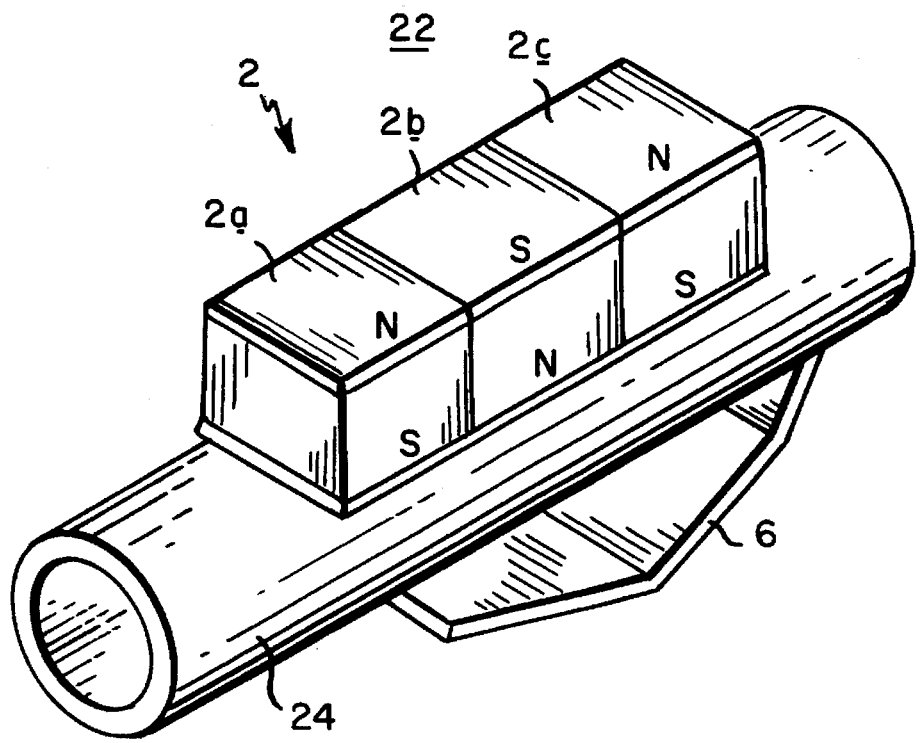
FIG. 2 is an elevational view of a magnetic fluid treatment device that does not have an outer housing.
Figure 3:
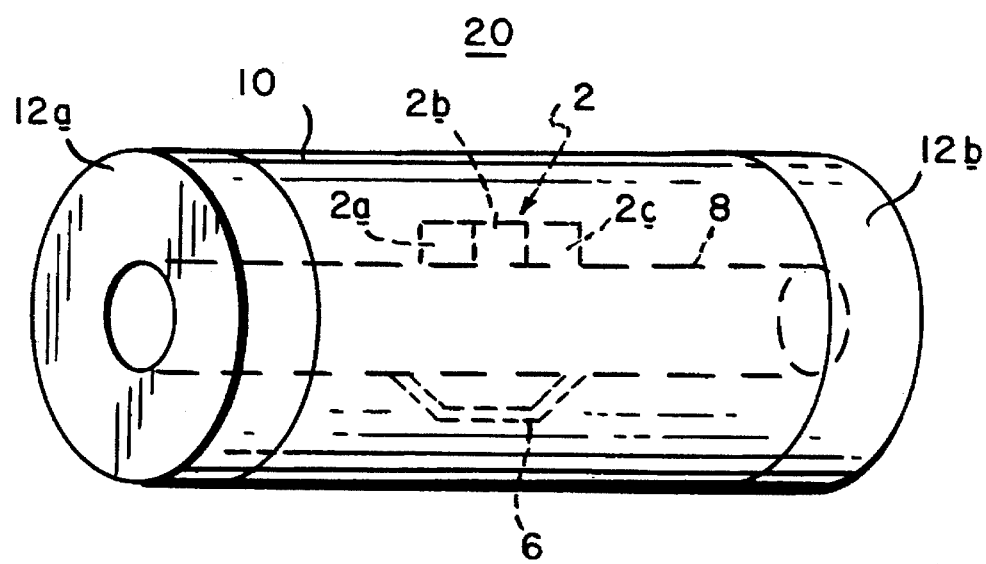
FIG. 3 is a side view of the magnetic fluid treatment device of FIG. 1.

There is shown in FIG. 1 a magnetic fluid treatment device 20 according to this invention that is adapted to fit over a pipe or tube. In a preferred embodiment, device 20 is about six inches long and 1.5 inches in diameter. As shown in FIGS. 2 and 3, bar magnets 2a, 2b and 2c are mounted upon non-ferromagnetic inner housing 8 of FIG. 3 and housing 24 of FIG. 2. Such bar magnets are preferably neodymium bar magnets that are serially aligned with opposite polarity along the length of housing 8. As clearly shown in FIG. 1, ferromagnetic strip 6 is aligned along the length of housing 8, directly opposing magnet set 2. Ferromagnetic strip 6 serves to interrupt the path of the flux lines created by magnets 2a, 2b, and 2c, and thus redirect the magnetic field created by magnets 2. The placement of magnet set 2 and ferromagnetic strip 6 serves to better concentrate the magnetic field emitted by magnet set 2 about the cross section of inner housing 8. Because this arrangement reduces the amount of magnetic field wasted outside of inner housing 8, the number of magnets that must be included in the design is reduced, effectively decreasing the manufacturing cost of the device. Magnets 2a, 2b, and 2c are aligned with opposite polarity to create a variable field of positive and negative forces within inner housing 8. This variable field tends to oscillate magnetic field sensitive molecules within the fluid. Such molecules include proteins, yeast, sugar, hydrocarbons and magnetostatic bacteria.

Device 20 also includes a non-ferromagnetic strip 4 disposed upon the top side of magnets 2a, 2b, and 2c. Magnets 2a, 2b, and 2c are preferably neodymium magnets. Such magnets are far less subject to cracking and chipping than typical alnico and ceramic bar magnets commonly used in the prior art. Most importantly, however, is the higher energy range of 37–40 Mg-Oe's commonly produced by the neodymium magnets. Alnico and ceramic bar magnets typically produce only 26–32 Mg-Oe. Because of this higher energy output, it is only necessary for device 20 to use three serially aligned ¼"×¼"×½" neodymium magnets. A further beneficial feature of neodymium magnets is the fact that they tend to have a significantly longer lifetime than other bar magnets used in the prior art, thus extending the ultimate lifetime of device 20.

As shown in FIGS. 1 and 3, non-ferromagnetic outer housing 10 and inner housing 8 are preferably cylindrical, thereby taking up a minimum amount of space. Inner housing 8 has lower portion 26 and upper portion 28 that are pivotably connected by hinges 19a and 19b to form cylindrically shaped inner housing 8. Similarly, outer housing 10 has a lower portion 30 and an upper portion 32 that are pivotably connected by hinges 18a and 18b to form cylindrical outer housing 10. These pivotably connected upper and lower portions of their respective housings allow the user to easily couple device 20 about the circumference of a cylindrical pipe. The diameter of inner and outer housings 8 and 10 can also be adjusted to compensate for varying diameters of treated pipes. Similarly, the diameter of housing 24 of device 22 in FIG. 2 can be adjusted for the same purposes. Non-ferromagnetic caps 12a and 12b are attached between inner housing 8 and outer housing 10 of device 20 to connect and hold the two housings in place.

FIG. 2 discloses device 22 which is identical to device 20 in that it includes neodymium magnets 2a, 2b, and 2c, a housing 24 analogous to inner housing 8, and ferromagnetic strip 6 disposed on the opposite side of housing 24 with respect to magnet set 2. Device 22, however, does not include an outer housing 10 or caps 12. Device 22 also can be adapted to have upper and lower portions pivotably attached by hinges for easy coupling and manipulation about the circumference of the pipe.

Devices 20 and 22 can also create a magnetic field by using an induction coil, a wire, or other known means that create magnetic fields, in place of magnets 2a, 2b, and 2c. Such a substitution, however, would require the addition of an external power supply that would improve the variability and flexibility of the magnetic field to a treated pipe. Such an apparatus could be used in many more potential magnetic treatment applications that require variable and differing strengths of magnetic fields.

Although specific features of this invention are shown in some drawings and not others, this is for convenience only as some feature may be combined with any or all of the other features in accordance with the invention.

Other embodiments will occur to those skilled in the art and are within the following claims:

What is claimed is:

1. An apparatus for magnetically treating fluids comprising:

a tubular non-ferromagnetic outer housing having a first longitudinal axis, said outer housing having first and second parts each including first and second longitudinal edges in opposed juxtaposition to form said tubular outer housing, and hinge means attached to at least one set of opposed said first and second longitudinal edges for pivotally connecting said first and second parts together;

a tubular non-ferromagnetic inner housing having a second longitudinal axis, said inner housing being coaxially disposed within said outer housing and adapted to coaxially surround a pipe through which fluid can flow, said inner housing having third and fourth parts each including third and fourth longitudinal edges in opposed juxtaposition to form said tubular inner housing, and hinge means attached at at least one set of opposed said third and fourth longitudinal edges for pivotally connecting said third and fourth parts together;

a series of neodymium bar magnets aligned along an axis parallel to the longitudinal axis of said inner housing and in end to end contact on only one exterior side of said inner housing, said magnets having polar surfaces facing in a direction normal to the longitudinal axis of said inner housing for creating a magnetic field within said pipe, wherein the polarity of the polar surface of each said magnet is opposite to the polarity of the polar surface of an adjacent said magnet;

a ferromagnetic body disposed on an exterior said of said inner housing opposed to said one exterior side on which said magnets are disposed for concentrating the magnetic field about the cross section of said inner housing; and a non-ferromagnetic retaining strip disposed between said series of bar magnets and said outer housing.

* * * * *